United States Patent [19]

Noguchi et al.

[11] Patent Number: 5,281,379
[45] Date of Patent: Jan. 25, 1994

[54] PROCESSES FOR MANUFACTURING THERMOPLASTIC RESIN COMPOSITIONS

[75] Inventors: Kentaro Noguchi; Junzo Shimokawa, both of Hofu; Koji Kudama, Yamaguchi; Toshio Yamauchi, Osaka; Kazuto Kiyohara; Toshiyuki Hagiwara, both of Hino, all of Japan

[73] Assignee: Kanebo, Ltd., Tokyo, Japan

[21] Appl. No.: 503,194

[22] Filed: Apr. 2, 1990

[30] Foreign Application Priority Data

| Apr. 5, 1989 | [JP] | Japan | 1-84637 |
| Jun. 1, 1989 | [JP] | Japan | 1-137349 |
| Jun. 8, 1989 | [JP] | Japan | 1-143989 |

[51] Int. Cl.$^5$ ............................ B29B 7/34; B29B 7/84
[52] U.S. Cl. ................................... 264/102; 264/349
[58] Field of Search .................. 264/68, 85, 101, 102, 264/211.23, 349

[56] References Cited

U.S. PATENT DOCUMENTS

| 2,125,860 | 8/1938 | Sommer | 366/4 |
| 2,935,763 | 5/1960 | Newman et al. | 264/101 |
| 3,840,188 | 10/1974 | Coombe et al. | 241/39 |
| 4,046,849 | 9/1977 | Lever et al. | 264/211 X |
| 4,153,541 | 5/1979 | Rumpf et al. | 209/143 |
| 4,877,819 | 10/1989 | Kiyohara et al. | 523/200 |

FOREIGN PATENT DOCUMENTS

| 182253 | 5/1986 | European Pat. Off. |
| 61-277421 | 12/1986 | Japan |
| 1404060 | 8/1975 | United Kingdom |
| 2111855 | 7/1983 | United Kingdom |

OTHER PUBLICATIONS

"Chemical Engineering Handbook", 5th Revised Edition, Maruzen, K. K., 1988 pp. 916-919 (English-Language Translation).
Abstract of Japan (Kokai) 55-6,433 (1980).
Abstract of Japan (Kokai) 56-15,404 (1981).
Abstract of Japan (Kokai) 56-15,405 (1981).
Abstract of Japan (Kokai) 58-898 (1983).
Abstract of Japan (Kokai) 58-212,908 (1983).
Abstract of Japan (Kokai) 59-126,547 (1984).
Abstract of Japan (Kokai) 60-224,812 (1985).
Abstract of Japan (Kokai) 61-118,746 (1986).
Abstract of Japan (Kokai) 61-277,421 (1986).
Abstract of Japan (Kokai) 62-39,208 (1987).
Claim 1 of Japan (Kokai) 55-39,370 (1980).

Primary Examiner—Leo B. Tentoni
Attorney, Agent, or Firm—Flynn, Thiel, Boutell & Tanis

[57] ABSTRACT

A process for manufacturing a thermoplastic resin composition by melt-kneading a thermoplastic resin and fine particles or an additive, includes: introducing gaseous and/or liquid fluid containing fine particles of at most 10 μm particle diameter or an additive to an unmelted granular or molten thermoplastic resin moving bed; adhering or depositing the fine particles or additive onto said moving bed, while the fluid in the gaseous state is being discharged; and then successively melt-kneading a mixture of the granular resin with the fine particles or additive. This process can be combined with a subsequent shaping step continuously that follows. The process of the invention saves energy, raw materials and labor consumptions and yields shaped articles of high quality and uniformity.

4 Claims, 9 Drawing Sheets

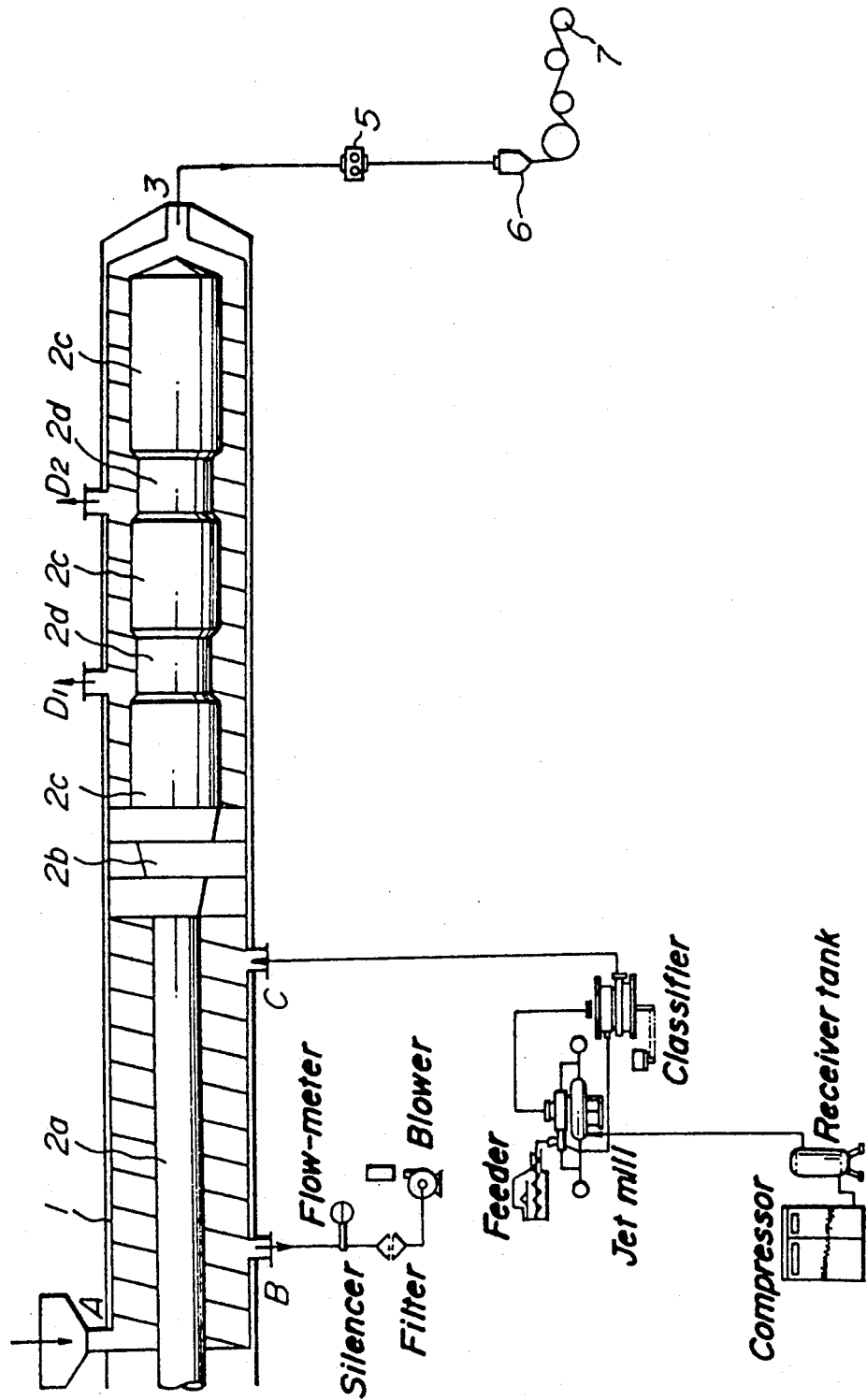
FIG_1

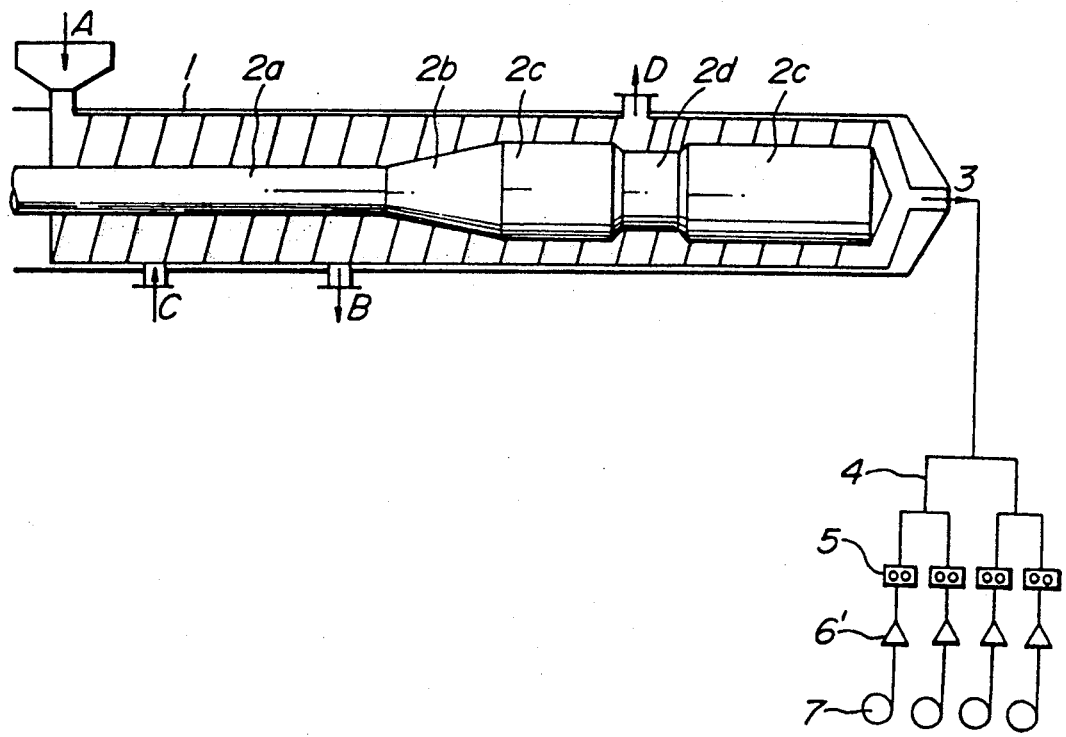
FIG_2

FIG_3
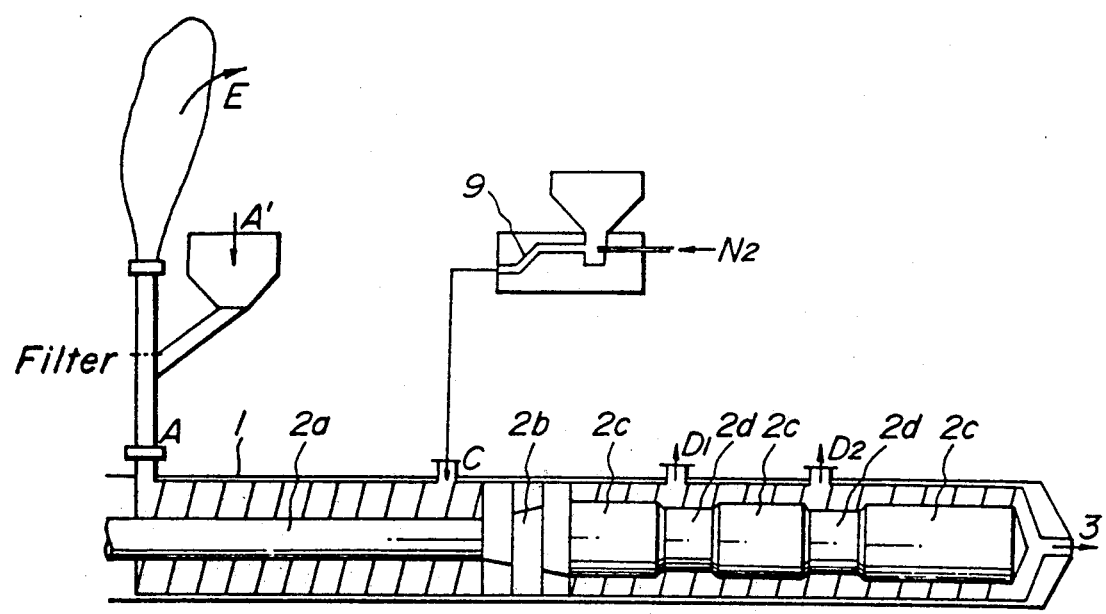

FIG_4
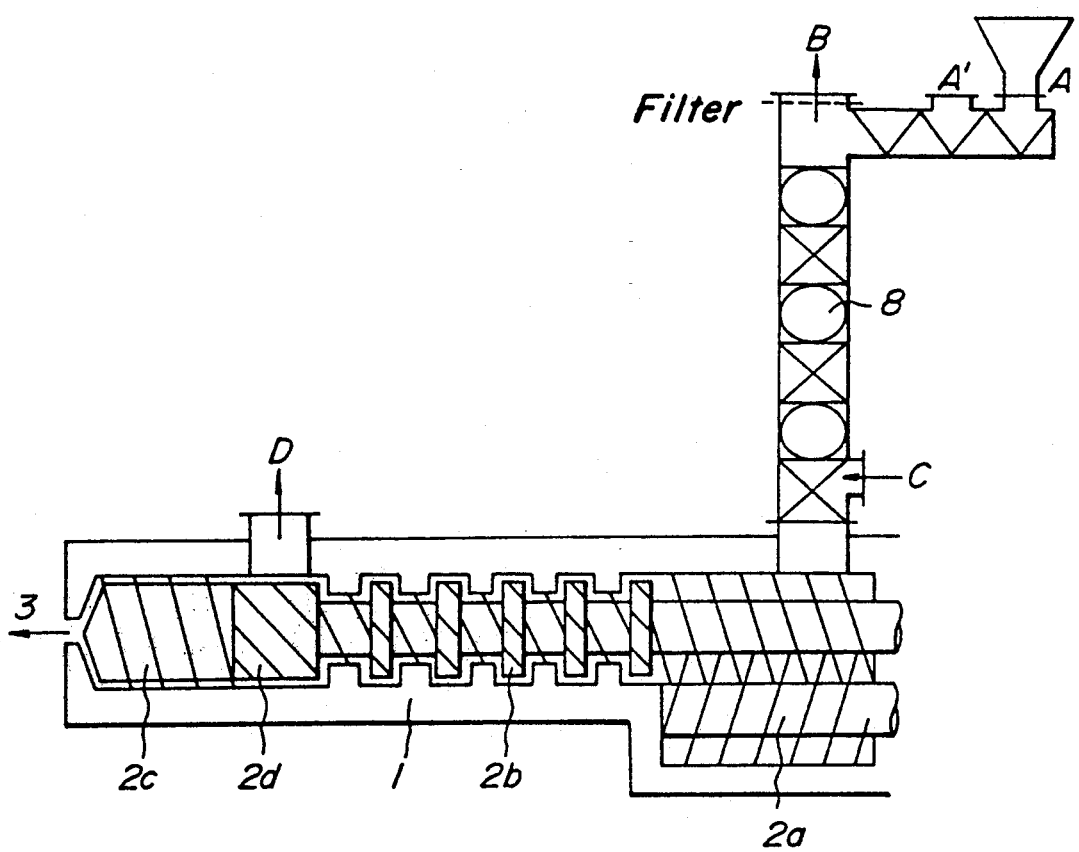

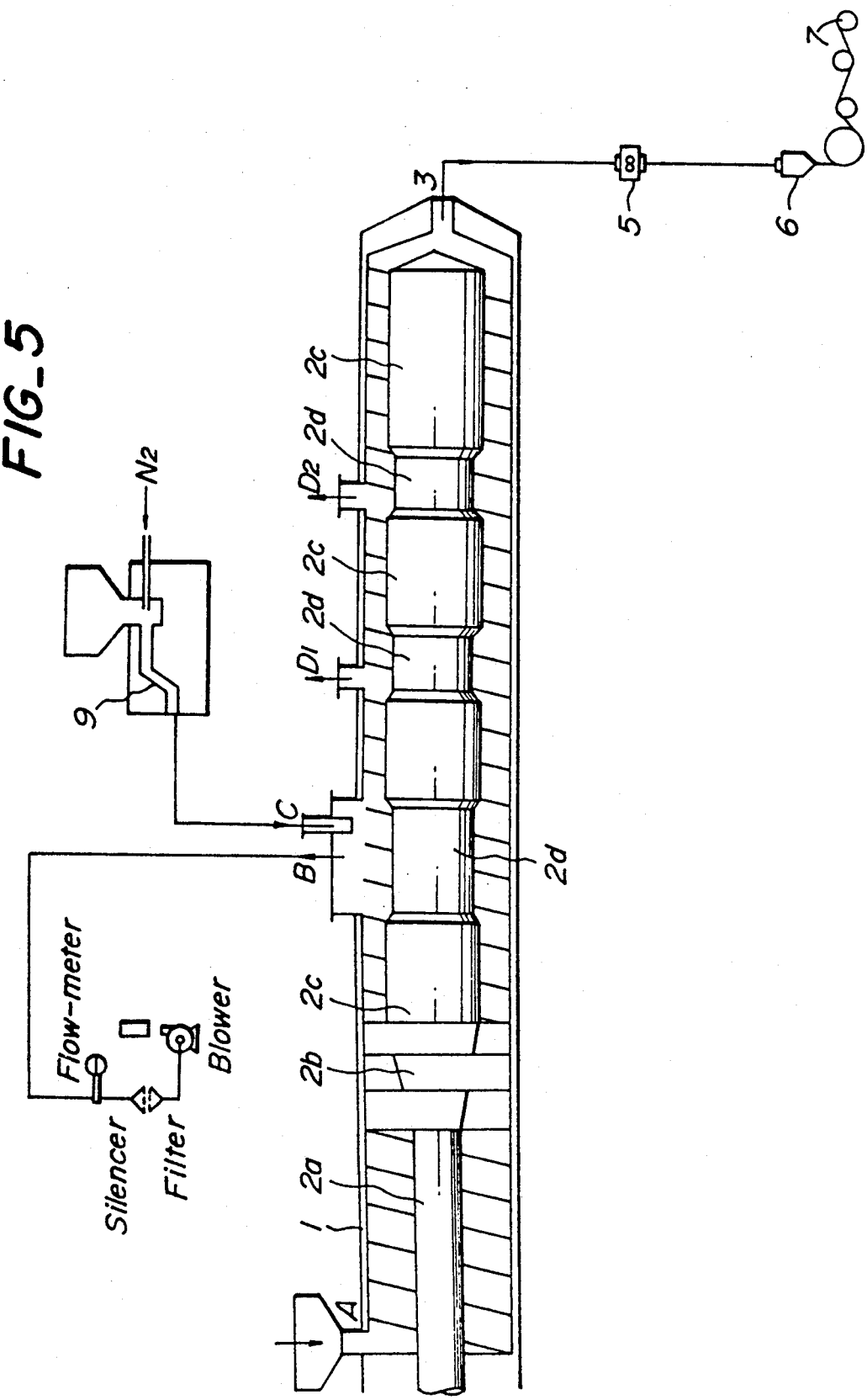

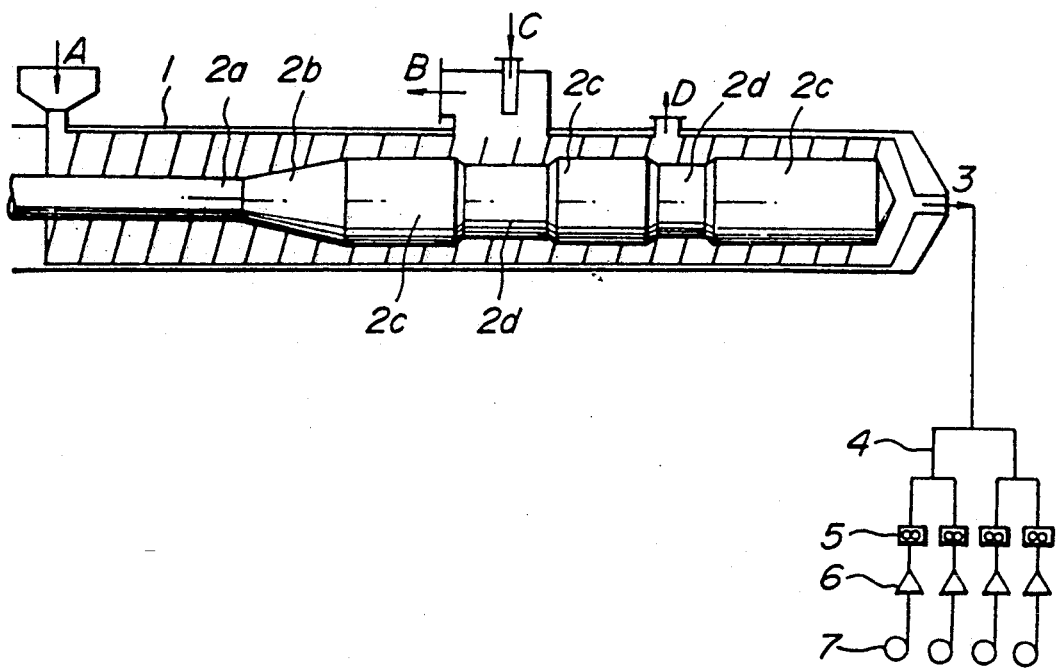
FIG_6

FIG_7
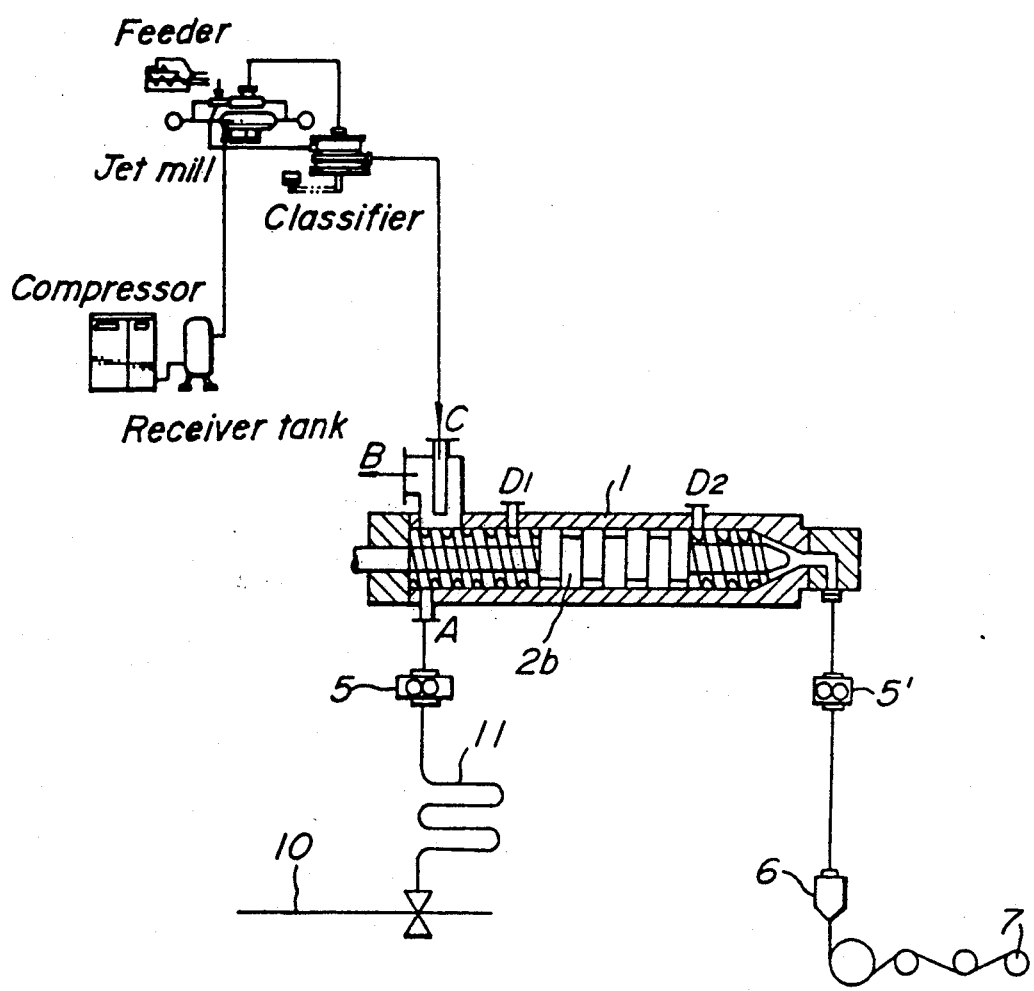

FIG_8
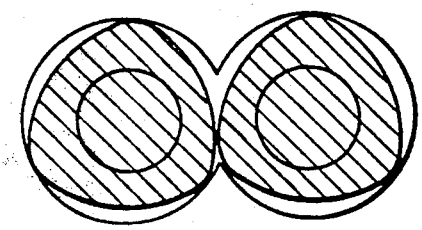
FIG_9
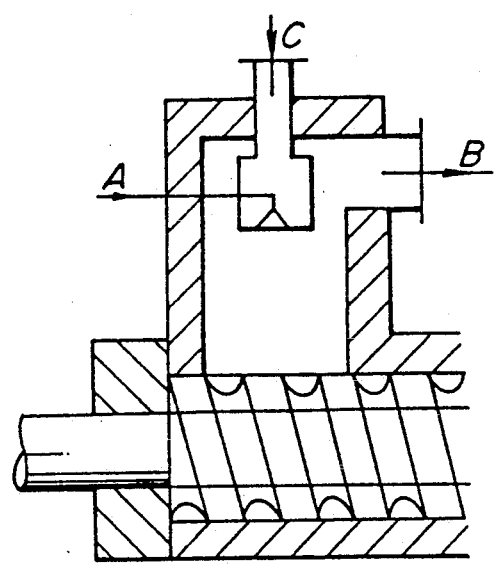

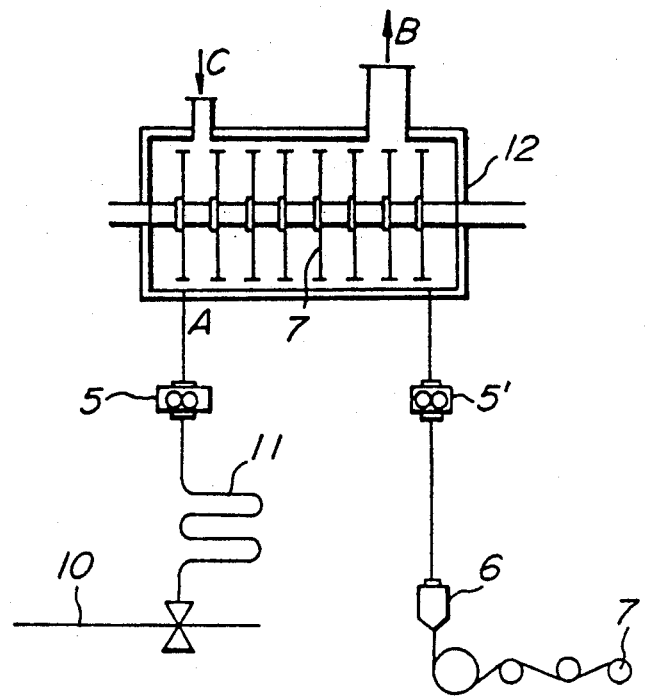
FIG_10
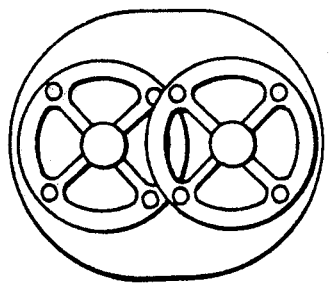
FIG_11
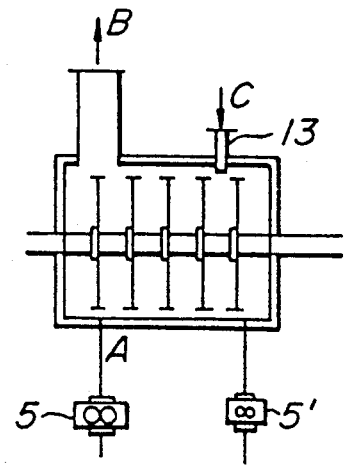
FIG_12

PROCESSES FOR MANUFACTURING THERMOPLASTIC RESIN COMPOSITIONS

BACKGROUND OF THE INVENTION

1. Field of the Invention

The present invention relates to a process for manufacturing functional composite materials to be shaped into plastic articles, such as fibers, molded articles, biaxially oriented films, or the like, which have been incorporated with fine particles or additives.

2. Description of the Prior Art

Heretofore, the mainstream of composite materials to be processed into shaped articles, etc. has been those comprising a thermoplastic resin compounded by melt-blending or kneading with a filler having a dimension of about 1 μm or more, such as glass fibers, carbon fibers, whiskers or the like (for example, Japanese Patent Application Laid-open No. 61-277,421). These composite materials have posed problems of appearance and impact resistance of the shaped articles that should have been improved. Alternatively, in the case where fine particles having a dimension of less than about 1 μm, such as titanium dioxide, carbon black, magnetic bodies or the like, are dispersed, the mainstream of the process has been those wherein the fine particles are dispersed uniformly by blending during polymerization of the thermoplastic resin. However, such processes have also presented problems such that practically employable fine particles are limited to those with a good heat resistance, such as titanium dioxide, carbon black or the like, due to the high temperature of the reaction system. A great deal of labor and expense are necessitated by installation of an exclusive polymerization equipment as well as cleaning work thereof, due to staining of the equipment. Further, there has been well-known a masterbatching system wherein fine particles or an additive are blend-kneaded in a high concentration. However, this has also presented problems that a great deal of energy and labor is required for drying both the resin before kneading and the masterbatch after kneading and, further, deterioration of the physical properties of the shaped articles due to the thermal history in the kneading step.

In view of these problems presented by the shaped articles made from conventional composite materials, there have been desired the advent of techniques for manufacturing various shaped articles or previously non-existent higher grade articles, such as biaxially oriented films, sheets, fibers or the like from composite materials containing fine particles, having a particle size of a submicron to micron order instead of conventional fillers having a particle size of 10 to several tens of microns. Namely, it is required to develop a novel technique wherein a powder process dealing with the submicron to micron grade fine particles is combined integrally with a polymer process. The powder process and the polymer process are essentially different techniques from each other. The construction of techniques wherein these are harmonized can be achieved by harmonization of pneumatic conveying techniques of the submicron grade fine particles with the polymer processes. For this purpose, there is required a treating or collecting technique of the submicron grade fine particles which matches the polymer processes.

Generally, the typical techniques which have been practiced industrially in the polymer processes are, for example, particle size reduction by means of a sand mill and dust collection by means of bag filters. However, these are not only difficult to make completely continuous as a polymer process but also pose a problem of moisture absorption, re-aggregation or the like of collected fine particles.

SUMMARY OF THE INVENTION

In view of the above facts, the present invention aims to solve the above problems by establishing a novel production technique comprising industrial and continuous powder processes for collecting submicron grade fine particles and polymer processes incorporated thereinto.

The above problems can be solved by adopting the collecting process of the fine particles by means of a granular or molten resin moving bed, as a collection or filtration technique, whereby the polymer process can be combined integrally with the powder process.

Namely, the process of the present invention for manufacturing a thermoplastic resin composition by melt-kneading a thermoplastic resin and fine particles or an additive, is characterized by introducing a gaseous or liquid fluid containing fine particles of at most 10 μm particle diameter or a solution or emulsion of said additive to a moving bed of an unmelted granular or molten thermoplastic resin, adhering or depositing said fine particles or additive onto said moving bed, while said fluid in the gaseous state is being discharged, and then successively melt-kneading a mixture of the granular or molten resin with said fine particles or additive. In the above process of the invention, it is preferred that the gaseous fluid containing fine particles is brought into contact with or impinged on the moving bed of the molten thermoplastic resin.

The process of the present invention may further comprise a shaping step of the resulting thermoplastic resin composition incorporated with the fine particles or additive, successively following the melt-kneading.

Furthermore, the object of the present invention will be further effectuated by combining the above process with a powder process or a continuous polymerization apparatus.

DESCRIPTION OF THE PREFERRED EMBODIMENTS

The thermoplastic resins to be employed in the present invention may be any of the known thermoplastic resins including polyesters such as polyethylene terephthalate, polybutylene terephthalate or the like, polyamides such as nylon-6, nylon-66, nylon-12 or the like, polyolefins such as polyethylene, polypropylene or the like, polyvinyl chloride, polycarbonates, polyurethanes, ABS resins, copolymers and blend polymers thereof and the like.

The term fine particles employed in the present description means particles having an average particle diameter of not more than 10 μm, preferably not more than 1 μm, which are in a solid state at room temperature or higher, preferably at not more than 100° C. As such fine particles, mention may be made of any known additive particles, for example, as described in "Practical Handbook on Additives for Plastics and Rubbers" edited by Kunio Goto, published by K.K. Chemical Industries in 1970, such as titanium dioxide, calcium carbonate, silica, talc, lithopone, zinc oxide, mica, barium sulfate, alumina, Kaolin, carbon black, tin oxide, glass beads, particles of metal such as gold, silver, copper, iron, lead, aluminum or the like, calcium silicate, zirconium oxide, zirconium carbide, ferrite such as $\gamma Fe_2O_3$, chromium dioxide or the like, antimony trioxide, antimony pentoxide, bromic compounds, dyes, pigments (including fluorescent brightener), antistatic agents, antibiotics, cross-linking agents, stabilizers, or the like.

The amount of fine particles to be compounded with the thermoplastic resin is generally at most 50% by volume based on the resin granules. In the present invention, it is effective when the particles are compounded in a large amount in the range of 1-50%, particularly 5-40%, by volume.

In the case where a gas is employed as the fluid, the fine particles contained in the gas are pneumatically conveyed to be introduced to, and preferably contacted with or impinged on, the granular thermoplastic resin moving bed. For the pneumatic conveyance, suction means, low-pressure transport means and high-pressure transport means may be used. Gas source equipment such as a Roots blower, compressor or the like, feeding pipes, gas-solid separators, etc. may be adequately selected in accordance with the properties of the fine particles, the mixing ratio (concentration by weight) of the fine particles to the gas, gas flow velocity, transport distance and the like. Further, fine particle dispersions in the gas can be obtained by feeding the fine particles and the gas into, for example, an ejector mechanism. However, a gas flow treatment by means of a jet mill or the like is preferred, since the fine particle dispersions in the gas which are rich in function can be obtained and pneumatically transported directly and continuously, without once recovering, to the kneading step. As an example, mention may be made of processes for subjecting a fine particle dispersed wet slurry to a drying step simultaneously with a size reduction step, and to a classification or surface modification step simultaneously with a size reduction step, by means of a jet mill, as well as a process for conducting simultaneously precision classification in dry and size reduction (Japanese Patent Application Publication Nos. 56-40634, 55-39370, 58-898 and 55-6433).

As a gas to be employed in the process of the invention, mention may be made of air, nitrogen, steam, $CO_2$, rare gases such as argon, preferably gases having a boiling point lower than the softening point temperature of the thermoplastic resin employed. Particularly preferred is an inert gas such as nitrogen gas, argon gas or the like. Further, if the gas is heated to a temperature at which the thermoplastic resin is neither melted nor cooled, gas consumption and energy for heating the resin can be saved, so it is preferred.

The concentration of the fine particles in the gas is usually 10-100,000 $g/Nm^3$, in most cases 100-30,000 $g/Nm^3$. Further, the transportation rate (flow velocity) of the gas containing the fine particles is generally 5-100 m/sec, preferably 10-40 m/sec. A too low transportation rate is not preferred in respects of reaggregation of the fine particles, clogging of pipe-lines, etc., while a too high transportation rate is also not preferred in respect of wear of equipment and pipe-lines. As for the pressure of the conveyor gas, generally employed is $-1.0$ to 10 $kg/cm^2$. In the case where the fine particles contained in the gas are impinged and collected on the molten resin, the jetting from a small nozzle is conducted at a flow velocity of at least 10 m/sec, preferably 40-200 m/sec.

As a liquid, solvent or dispersing medium to be employed in the process of the invention, mention may be made of water, acetone, chloroform, tetrachloroethane, cyclohexane, benzene, toluene, xylene, alcohols, ethers or the like. In the case of the granular moving bed, preferably employed are liquids or solvents having a boiling point temperature lower than the softening point temperature of the thermoplastic resin employed. Further, if the liquid is heated to a temperature at which the thermoplastic resin is neither melted nor cooled, the energy for heating the resin can be saved, so it is preferred.

The concentration of the fine particles in the liquid or the concentration of the additive in the solution or dispersion is usually 1-80% by weight, in most cases 10-60% by weight. Further, the transportation rate (flow velocity) of the liquid containing the fine particles is generally 0.01-10 m/sec. A too low transportation rate is not preferred in respect of reaggregation of the fine particles clogging of pipe-lines, etc., while too high transportation rate is also not preferred in respect of wear of equipment and pipe-lines. Further, for preparing a stabilized or highly concentrated emulsion, there may be used, if required, known emulsifiers, such as various surfactants, gelatines, gum arabic, alginates, fatty esters, metallic salts, or the like.

Dispersion or dissolution of the fine particles or additives is usually conducted by mechanical agitation by means of agitating elements, baffle plates or the like, vibration by means of ultrasonic vibration or the like, mixing by means of static mixers, jetting from a small aperture, or the like. For example, a liquid containing fine particles can be appropriately prepared usually by wet milling machines such as ball mills, oscillating mills, sand mills, or the like. The milling can be combined with a wet classification operation or filtration by a filter, if required. Further, when a media-agitation mill is employed, the loading amount, size, treating time and passing frequency of the media such as glass beads or alumina beads, are adequately selected. In the case where the fine particles in the liquid are apt to aggregate, it is preferred to use a suspension stabilizer in order to disperse with uniformity and stability. As a suspension stabilizer, mention may be made of gum arabic, gelatines, carboxymethyl cellulose, sodium alginate, barium sulfate, talc, glues or the like. These are adequately selected. The thus prepared liquid containing the fine particles is introduced to the granular resin moving bed through an appropriate metering and feeding mechanism, such as centrifugal pumps, piston pumps, an Ulrich pump, or the like, and pipe-lines, in accordance with the properties of the fine particles, the mixing ratio (concentration by weight) of the fine particles to the liquid, liquid flow velocity, transport distance and the like.

The granules to be employed in the present invention are granules or powder having a dimension of 0.1-10 mm along each of the three mutually perpendicular axes, preferably granules having such a dimension of 1-5 mm. The granular thermoplastic resin moving bed upstream can be obtained by a mechanism having functions of feed, charge and discharge of the granular thermoplastic resin. For example, it is readily obtained by a single or double screw kneader extruder maintained at a temperature lower than the melting point or softening point of the thermoplastic resin, or by a pipe-line provided with a mechanism for feeding and discharging the granular thermoplastic resin, as well as by a static tubular mixing device. In the case where such a granular thermoplastic resin moving bed is formed by a double screw kneader extruder, letting the diameter of the screw be D, it is preferred to form the extruder so as to make the dwell time about 1-3 minutes in a zone extending 3-15D long from the feed opening. If the length of the zone is less than 2D, the fine particle collection will be insufficiently effected, while if it exceeds 20D, the fine particle collection effect will be saturated and the apparatus becomes too long and large, so that both cases are not preferred. Further, the liquid, solvent or dispersing medium containing the fine particles or additive which has been introduced to the granular moving bed upstream is heated here to vaporize it.

The fine particles adhere to or deposit by the so-called "inertial particle collecting action" onto the granular thermoplastic resin moving bed, so that as the fine particles gradually adhere onto the surfaces of the resin granules, the fine particles adhere to each other, forming bridges, and eventually form deposit layers of the fine particles in the granular resin bed. A filtering action by the fine particle deposit layers is the gist of the present invention. This filtering action depends on the gas flow velocity as well as the moving rate, particle diameter, properties and specific gravity of the resin granules. Further, the pressure loss increases as the fine particles deposit. However, in the process of the present invention, since the mixer of the resin granules and fine particles constantly moves towards the subsequent step and is renewed, a substantially constant pressure loss can be maintained, which allows the fine particles to be collected with high efficiency and stability. The fine particles are collected in an amount of usually at least 50%, in most cases at least 80%, by weight, on the resin granules.

The molten thermoplastic resin moving bed can be obtained by a mechanism having functions of feed and discharge of the molten thermoplastic resin. For example, it is readily obtained by a single or double screw kneader extruder for melt-kneading at a temperature higher than the melting point of the granular thermoplastic resin, or by a pipe-line or kneading bath provided with a mechanism for feeding and discharging the molten resin, as well as by a static tubular mixing device.

In the process of the present invention, the fine particle collection may be conducted by a process wherein a gas containing the fine particles is brought into contact with or impinged on the aforementioned molten resin moving bed. The molten resin having collected the fine particles thereon constantly moves towards the subsequent step and is renewed, so that the fine particles can be collected with high efficiency and stability (the time for collection is usually set to at most about 10 minutes, in most cases at most 3 minutes). Particularly when the gas containing the fine particles is jetted out from a small aperture and impinged at a flow velocity of at least 10 m/sec, the so-called "inertial particle collecting action" functions effectively, so it is preferred. Alternatively, a process wherein, for example, a Laval nozzle or Ventui tube is used to jet at a flow velocity of at least 40 m/sec and the fine particles are collected, is preferred, for the particle size of the collected fine particles can be reduced and gas consumption can be saved. Further, a process wherein a gaseous stream containing the fine particles is jetted at a velocity of at least 40 m/sec, entraining molten resin extruded from an orifice and the fine particles are collected on the molten resin, is preferred, for the surface area of the molten resin can be augmented enormously whereby the collecting efficiency and dispersibility of the fine particles are improved.

Although the gas from which the fine particles have been removed may be discharged at either side of the feeding position or melt-kneading position of the granular thermoplastic resin, in the upstream zone, the feeding size is preferred. Further, a discharge vent can be provided in common with a feed opening (FIG. 3). Furthermore, the discharge also can be effected by vacuum suction with a blower or the like.

In the process of the present invention, the melt-kneading of the mixture of the thermoplastic resin granules and fine particles is conducted by, for example, a kneader extruder provided with a cylinder housing a screw or rotor, or in a mixing tank equipped with agitating elements ("Chemical Engineering Handbook, 5th revised edition, pp.916-919, edited by Chem, Eng. Soc., published by Maruzen K.K. in 1988). When the thermoplastic resin contains moisture or when the gas incorporated during melt-kneading is desired to be degassed, it is preferred to provide a vent hole through which outgassing is conducted by means of vacuum or nitrogen gas flow. Further, in the case of polyester resins, nylon resins, polyethylene resins or the like, which are denatured or evolve volatile matter during melt-kneading, it is preferred to use a double screw kneader extruder equipped with equi-directionally rotating or counter-rotating screws and provided with a plurality of vent holes, since it has an outgassing action functionable under high vacua.

The melt-kneaded, fine particles dispersed resin composition is extruded from an output port provided on the nose of the cylinder and may be shaped into fibers, sheets, films or molded articles according to conventional processes by leading the extrudate directly to a spinneret, die or mold for forming the fibers, sheets, films or molded articles, or by forming pellets or powder, followed by such shaping.

The present invention will be further illustrated with reference to the appended drawings showing apparatuses to be employed in the process of the invention.

BRIEF DESCRIPTION OF THE DRAWINGS

FIG. 1 is a schematic illustration of the first embodiment of the invention.

FIG. 2 is a schematic illustration of the second embodiment of the invention.

FIG. 3 is a schematic illustration of the third embodiment of the invention.

FIG. 4 is a schematic illustration of the fourth embodiment of the invention.

FIG. 5 is a schematic illustration of the fifth embodiment of the invention.

FIG. 6 is a schematic illustration of the sixth embodiment of the invention.

FIG. 7 is a schematic illustration of the seventh embodiment of the invention.

FIG. 8 is a cross-sectional view of the kneading machine used in the embodiment of FIG. 7;

FIG. 9 is a partial sectional view of a modification of the embodiment of FIG. 7;

FIG. 10 is a schematic illustration of the eighth embodiment of the invention.

FIG. 11 is a cross-sectional view of the double axial mixer used in the embodiment of FIG. 10; and FIG. 12 is a schematic illustration of the ninth embodiment of the invention.

In FIG. 1, the numeral 1 is a cylinder of a double screw kneader extruder. This cylinder 1 accommodates a pair of screws 2 rotating equi-directionally. On the cylinder 1, a resin feed opening A, a gas discharge vent B, an inlet port C for gas containing fine particles and a couple of vent holes $D_1$ and $D_2$, are provided in sequence in this order, spaced from each other along the longitudinal axis of the cylinder. The resin feed opening A is positioned at the extremity of the upstream zone of the cylinder 1, and the downstream zone of the cylinder terminates at an outlet port 3. Further, in this embodiment of the invention, a transit zone where the resin granules begin to melt is located between the above-mentioned two zones, preferably between the gas inlet port C and vent hole $D_1$. The screw 2 has a 65 mm diameter, 15 mm deep-channels in the upstream zone 2a, the deep-channels being transformed to shallow flights in the melt-begging zone 2b, i.e. a kneading disk, 4 mm shallow flights in the downstream zone 2c, i.e., the melt-kneading zone, and 6 mm slightly deep-channels in vent hole portions 2d provided in the melt-kneading zone. The cylinder is provided with a heater (not shown). Further, the upstream zone (deep-channel portion 2a) is 780 mm long, the transit zone (melt-beginning zone 2b) is 195 mm long, the downstream zone (the shallow flight portions 2c including the vent hole portions 2d) is 585 mm long, and the distance between the gas discharge vent B and the gas inlet port C is 585 mm.

On the resin feeding opening A, a feed hopper hermetically enclosing resin granules is mounted with a chute being interposed therebetween. The gas discharge vent B is connected via a filter with a suction blower. Into the gas inlet port C, a gas containing fine particles is introduced under pressure, through a classifying device and a milling device of aggregated particles, from a gas compressor and a fine particle feeding device. If, for example, the jet mill disclosed in Japanese Patent Application Laid-open No. 62-8215 is employed, a surface treatment and drying can be further effected. The vent hole $D_1$ is connected with a nitrogen gas flow apparatus (not shown) and the vent hole $D_2$ is connected with a vacuum pump (not shown).

Further, the outlet port 3 of the cylinder is connected via a gear pump 5 with a T-die 6 having a slit. The resin composition is extruded from the slit onto a rotating quenching drum and quenched thereon to form a sheet. Then, this sheet is stretched to form a biaxially oriented film and then heat-set followed by quenching and winding on a roll.

Additionally, the known processes disclosed in Japanese Patent Application Laid-open No. 61-118,746, etc. can be applied to the process for forming films. The obtained films are useful as supports for reflection photographic elements. The preparation of materials for the reflection photographic elements with such a film, is also disclosed in Japanese Patent Application Laid-open No. 61-118,746. etc.

In FIG. 2, the numeral 2 is a screw of a single screw extruder. The extruder is provided with a resin feed opening A, an inlet port C for a gas containing fine particles, a gas discharge vent B, and a vent hole D, in sequence from upstream to downstream, spaced from each other along the longitudinal axis of the cylinder. Further, in this embodiment of the present invention, the melt-beginning zone of the resin granules is located between the above-mentioned gas discharge vent B and vent hole D. The screw 2 has a 70 mm diameter, 16 mm deep-channels in the upstream zone 2a, deep-channels gradually transforming to shallow flights in the transit zone 2b, 4 mm shallow flights in the downstream zone 2c, i.e., a melt-kneading zone and 6 mm slightly deep-channels in a vent hole portion 2d provided in the melt-kneading zone. The cylinder is provided with a heater (not shown).

On the resin feed opening A, a feed hopper hermetically enclosing resin granules is mounted which a chute (not shown) being interposed therebetween. The gas discharge vent B is connected via a filter with a suction blower. Into the gas inlet port C, a gas containing fine particles is introduced under pressure, through a classifying device and a milling device of aggregated particles, from a gas compressor and a fine particle feeding device. The vent hole D is connected with a vacuum pump.

Further, the outlet port 3 of the cylinder is connected via a manifold 4 and gear pumps 5 with spinnerets 6'. A resin composition is extruded from the spinnerets to form filament yarns which are wound on bobbins 7.

FIG. 3 shows another embodiment wherein, with an apparatus similar to that shown in FIG. 1, for example, a heated nitrogen gas stream is jetted at a pressure of 10 kg/cm$^2$ on fine particles and impinged on a baffle plate 9 to reduce the particle size, simultaneously conveying pneumatically the fine particles to the gas inlet port C, and then the gas is separated by a filter mesh from resin granules fed through the resin feed opening A' and then discharged from a cloth filter bag E (Japanese Patent Application Laid-open No. 58-104,642).

FIG. 4 shows a different embodiment wherein resin granules fed from a resin feed opening A and powdery resin particles fed from a resin feed opening A' are continuously charged by a screw feeder into 3-12 static mixing elements 8 mounted for forming a granular moving bed. Further, a gas inlet port C can be provided above a deep-channel portion 2a of the double screws.

FIGS. 5-7 and 10 are schematic view showing preferred embodiments of the apparatus suitable for performing the present invention.

In FIG. 5, the numeral 1 is a cylinder of a double screw kneader extruder. This cylinder 1 accommodates a pair of screws 2 rotating equip-directionally. On the cylinder 1, a resin feed opening A, a gas discharge vent B, an inlet port C for a gas containing fine particles and a couple of vent holes $D_1$ and $D_2$, are provided in sequence, spaced from each other along the longitudinal axis of the cylinder. The resin feed opening A is positioned at the extremity of the upstream zone of the cylinder 1, and the downstream zone terminates at the output port 3. The screw 2 has a 65 mm diameter, 15 mm deep-channels in the upstream zone 2a, deep-channels transformed to shallow flights in the transit zone, i.e., melt-beginning zone 2b, i.e., a kneading disk, 4 mm shallow flights in the downstream zone 2c i.e., a melt-kneading zone, and 6 mm slightly deep-channels 2d in the gas discharge vent B, gas inlet port C and vent hole D portions provided in the melt-kneading zone. The cylinder is provided with a heater (not shown). Further, the upstream zone (the deep-channel portion 2a) is 390 mm long, the transit zone (melt-beginning zone 2b) is 195 mm long, the downstream zone (the shallow flight portions 2c and 2d including the vent hole, gas inlet port and vent hole portions) is 1365 mm long.

On the resin feed opening A, a feed hopper hermetically enclosing resin granules is mounted with a chute being interposed therebetween. The gas discharge vent B is connected via a filter with a suction blower. Into the gas inlet port C, is introduced a pressurized nitrogen gas stream entraining fine particles, the particle size of which is reduced by jetting the heated nitrogen gas stream at a pressure of, for example, 5 kg/cm$^2$ on the fine particles and impinging on a baffle plate 9. The vent hole $D_1$ is connected with a nitrogen gas flow apparatus (not shown) and the vent hole $D_2$ is connected with a vacuum pump (not shown).

In FIG. 6, the numeral 1 is a single screw extruder. The extruder is provided with a resin feed opening A, an inlet port C for a gas containing fine particles, a gas discharge vent B, and a vent hole D, in sequence from upstream to downstream, spaced from each other along the longitudinal axis of the cylinder. The screw 2 has a 70 mm diameter, 16 mm deep-channels in the upstream zone 2d, deep-channels gradually transformed to shallow flights in the transit zone, i.e., melt-beginning zone 2b, 4 mm shallow flights in the downstream zone 2c, i.e., a melt-kneading zone, and 6 mm slightly deep-channels in the vent hole portions 2d in the melt-kneading zone. The cylinder is provided with a heater (not shown).

On the resin feed opening A, a feed hopper hermetically enclosing resin granules is mounted with a chute (not shown) being interposed therebetween. The gas discharge vent B is connected via a filter with a suction blower. Into the gas inlet port C, a hearted gas containing fine particles is introduced under pressure. The vent hole D is connected with a vacuum pump (not shown).

In FIG. 7, a molten resin taken out from a liquid transfer pipe 10 of a continuous polymerization apparatus (not shown) is cooled with coolant jackets of a cooling device 11 and the transfer pipe 10, and fed into a kneading machine 1 through a metering pump 5 and a resin feed opening A. A gas containing fine particles is conveyed pneumatically from a gas compressor and a fine particle feeding device, via milling and classifying devices, into a gas inlet port C. The fine particles are collected on the molten resin and kneaded. The kneading machine has a structure comprising double axial kneading disks 2b as a main component, and is provided with an outer jacket through which a coolant circulates to restrict heat generation. A fine particle dispersed molten resin extruded from the kneading machine is transferred by a metering pump 5' to a shaping apparatus such as a die, spinneret or the like. FIG. 8 is a cross-sectional view of the kneading machine 1. FIG. 9 is a schematic cross-sectional view showing a further different embodiment of an apparatus wherein, with the apparatus shown in FIG. 7, a gas containing fine particles is jetted, entraining a molten resin fed from A, and the fine particles are collected on both the jetted molten resin and molten resin on the screw.

FIG. 10 shows a yet different embodiment of an apparatus wherein a horizontal double axial disk type mixer is used in lieu of the double screw kneader extruder shown in FIG. 7. With this apparatus, a broad space for reaction is secured and a kneading action mainly effecting mass replacement is performed. A heat jacket 12 through which a heating medium circulates is provided to maintain a proper temperature inside the resin.

FIG. 11 is a cross-sectional view of a double axial mixer shown in FIG. 10. Further, FIG. 12 is an embodiment of an apparatus wherein a gas is jetted and fed by an ejector 13 and discharged from the resin feed side.

The present invention will be further explained by way of example.

EXAMPLE 1

Polyethylene terepthalate pellets having a dimension of 3.0 mm dia. ×3.0 mm length and an intrinsic viscosity of 0.74 were fed at a feed rate of 83 kg/hour into the resin feed opening A of the double screw kneader extruder shown in FIG. 1. Nitrogen gas containing titanium dioxide of anatase form having an average particle diameter of 0.3 μm which had been reduced in size by a jet mill (with a concentration of 1 kg/Nm$^3$, at a temperature of 210° C., and a pressure of 6 kg/cm$^2$) was introduced into the gas inlet port C at a feed rate of 17 Nm$^3$/hour. The temperatures of the cylinder were set to 210° C. in the upstream zone, 280° C. in the transit zone and 290° C. in the downstream zone. Feeding a nitrogen flow into the vent hole $D_1$ at a feed rate of 3.6 Nm$^3$/hour and vacuumizing the vent hole $D_2$ to 5 Torr., melt-kneading was conducted. After melt-kneading, the mixture was extruded from a T-die at 290° C. and quenched on a rotating drum to produce an amorphous sheet 1.1 mm thick. Then, this sheet was stretched lengthwise 3.0 times at 100° C. and then crosswise 3.0 times at 110° C. and then heat-set at 200° C., followed by quenching and winding on a roll. The obtained film 125 μm thick had an opaque white color and an intrinsic viscosity of 0.61. Further, the stretching and shaping were able to be conducted continuously with good stability.

The resulting film had a good white color, and discoloration, etc., due to polymer decomposition side products, were not observed. The film which was very useful as supports for reflection photographic elements.

EXAMPLE 2

Polyethylene pellets having a dimension of 3.0 mm dia. ×3.0 mm length and an average molecular weight of 80,000 were fed at a feed rate of 80 kg/hour into the resin feed opening A' of the double screw kneader extruder shown in FIG. 3. Air Y containing electro-conductive fine particles having a specific resistance of 6.3 Ω·cm, (hereinafter referred to as "electro-conductive particles X") which had been obtained by mixing and firing titanium dioxide particles having on the surface 15 wt. % of tin oxide film with 0.75% wt. % of antimony oxide based on the titanium dioxide particles with a concentration of 500 g/Nm$^3$, at room temperature, and a pressure of 10 kg/cm$^2$, was introduced into the gas inlet port C at a feed rate of 40 Nm$^3$/hour (Japanese Patent Application Laid-open No. 58-104,642). The temperatures of the cylinder were set to 50° C. in the upstream zone, 230° C. in the transit zone (melt-beginning zone) and 240° C. in the downstream zone. Vacuumizing the vent holes $D_1$ and $D_2$ to 10 Torr., melt-kneading was conducted. After melt-kneading, the mixture was extruded from a die to produce pellets $Z_{20}$ of 3.0 mm dia. ×3.0 mm length.

Then, feeding the obtained pellets $Z_{20}$ into the resin feed opening A' at a feed rate of 75 kg/hour, the air Y containing the above electro-conductive particles X into the gas inlet port C at a feed rate of 50 Nm$^3$/hour, then, kneading was conducted under the aforementioned conditions to produce pellets $Z_{40}$.

Then, feeding the pellets $Z_{40}$ at a feed rate of 66.7 kg/hour and air Y' containing the electro-conductive particles X (with a concentration of 1,000 g/Nm$^3$, at room temperature) at a feed rate of 33.3 Nm$^3$/hour, melt-kneading was conducted under the aforementioned conditions to produce pellets $Z_{60}$.

Then, feeding the pellets $Z_{60}$ at a feed rate of 62.5 kg/hour and the air Y' containing the electro-conductive particles X at a feed rate of 37.5 $Nm^3$/hour, melt-kneading was conducted under the aforementioned conditions to produce pellets $Z_{75}$ of polyethylene composition having 75% by weight of the electro-conductive particles X dispersed therein.

Then, an electro-conductive composite yarn was manufactured in the same manner as the yarn $Y_5$ of Example 2 described in Japanese Patent Application Laid-open No. 60-224,812, except that the pellets $Z_{75}$ were used as an electro-conductive component. The operabilities in spinning and drawing were good, and the yarn properties and electro-conductivity of the obtained electro-conductive composite yarn were good as well.

EXAMPLE 3

Into the resin feed opening A of the kneader extruder (provided with double screws of 60 mm O.D. only in the $2a$ portion and a 6 element static mixer 8 of 80 mm I.D., 480 mm long) shown in FIG. 4, were fed polybutylene terephthalate pellets of about 3 mm dia.×3 mm length (NOBADOL 5010, trademark of polybutylene terephthalate pellets manufactured by Mitsubishi Kasei Corporation) at a feed rate of 65 kg/hour, and styrene/-butadiene block copolymer pellets of about 3 mm dia.×3 mm length of styrene/butadiene block copolymer pellets (DenkA STR1602, trademark, manufactured by Denki Kagaku Kogyo K.K.) at a feed rate of 20 kg/hour. Into the resin feed opening A', were fed a brominated polystyrene powder having an average particle diameter of about 0.1 mm (PYROCHECK 68PB, trademark of brominated polystyrene powder manufactured by Nissan Ferro-organic Chemicals K.K.) at a feed rate of 15 kg/hour. Into the gas inlet port C, nitrogen gas containing antimony trioxide particles having a particle diameter of 0.3 $\mu$m (with a concentration of 500 g/$Nm^3$, at 150° C.) was introduced at a feed rate of 10 $Nm^3$/hour. The gas was discharged through a cloth filter by suction with a blower from the gas discharge vent B. The temperatures of the cylinder were set to 150° C. in the double screw zone, 240° C. in the kneading zone $2b$, and 260° C. at the vent portion $2d$ and the metering portion $2c$, vacuumizing the vent hole D to 10 Torr., melt-kneading was conducted. The mixture was extruded to produce pellets of 3.0 mm dia.×3.0 mm length.

Then, various test-pieces were injection molded under usual conditions. The injection molding was able to be conducted with good stability. Further, the test-pieces had an excellent impact resistance in addition to a high fire retardancy.

EXAMPLE 4

Polyethylene terephthalate pellets having a dimension of 3.0 mm dia.×3.0 mm length and an intrinsic viscosity of 0.33 were fed at a feed rate of 83 kg/hour into the resin feed opening A of the double screw kneader extruder shown in FIG. 1. Hot water containing titanium dioxide of anatase form having an average particle diameter of 0.3 $\mu$m (an aqueous slurry with a concentration of 40% by weight, at a temperature of 90° C.) was introduced into the inlet port C at a feed rate of 42.5 kg/hour. Discharging steam from the gas discharge vent B, the temperatures of the cylinder were set from 120° C. to 210° C. in the upstream zone, 280° C. in the transit zone (melt-beginning zone) and 290° C. in the downstream zone. Vacuumizing the vent hole $D_1$ to 10 Torr. and the vent hole $D_2$ to 5 Torr., kneading was conducted. After kneading, the mixture was extruded from a T-die at 290° C. and quenched on a rotating drum to produce an amorphous sheet 1.1 mm thick. Then, this sheet was stretched lengthwise 3.0 times at 100° C. and then crosswise 3.0 times at 110° C. and then heat-set at 200° C., followed by quenching and winding on a roll. The obtained film 125 $\mu$m thick had an opaque white color and an intrinsic viscosity of 0.60. Further, the drawing and shaping were able to be conducted continuously with good stability.

The resulting film had a good white color and discoloration or agglomerates, due to polymer decomposition side-products, was not observed. The film was very useful as supports for reflection photographic elements.

EXAMPLE 5

A film was produced in the same manner as Example 4, except that the hot water slurry containing titanium dioxide, suspended with a fluorescent brightener, (LEUCOPHOR EGM, trademark of fluorescent brightener manufactured by Sandoz), in a concentration of 0.11% by weight, was fed into the inlet port C. The resulting film exhibited a shining, excellent whiteness uniform all over, which demonstrated that the fluorescent brightener was incorporated uniformly.

EXAMPLE 6

Polyethylene terephthalate pellets having an intrinsic viscosity of 0.74 were fed at a feed rate of 83 kg/hour into the resin feed opening A of the double screw kneader extruder shown in FIG. 5. Nitrogen gas containing titanium dioxide of anatase form having an average particle diameter of 0.3 $\mu$m (with a concentration of 0.5 kg/$Nm^3$, at a temperature of 265° C., and a pressure of 5 kg/$cm^2$) was introduced into the gas inlet port C at a feed rate of 34 $Nm^3$/hour. The temperatures of the cylinder were set to 210° C. in the upstream zone, 280° C. in the transit zone (the melt-beginning zone) and 280° C. in the downstream zone. Feeding a nitrogen flow into the vent hole $D_1$ at a feed rate of 3.6 $Nm^3$/hour and vacuumizing the vent hole $D_2$ to 5 Torr., melt-kneading was conducted. After melt-kneading, the mixture was extruded from a T-die at 290° C. and quenched on a rotating drum to produce an amorphous sheet 1.1 mm thick. Then, this sheet was stretched lengthwise 3.0 times at 100° C. and then crosswise 3.0 times at 110° C. and then heat-set at 200° C., followed by quenching and winding on a roll. The obtained film, 125 $\mu$m thick, had an opaque white color and an intrinsic viscosity of 0.64. Further, drawing and shaping were able to be conducted continuously with good stability.

The resulting film had a good white color and discoloration, etc., due to polymer decomposition side-products, were not observed. The film was very useful as supports for reflection photographic elements.

EXAMPLE 7

Nylon-6 pellets having a relative viscosity $\eta r$ of 2.70 were fed at a feed rate of 19.8 kg/hour into the resin feed opening A of the single screw kneader extruder shown in FIG. 6. Nitrogen gas containing a isoindolinone pigment (C.I. PIGMENT YELLOW 110, isoindolinone pigment manufactured by Ciba Geigy), having an average particle diameter of 20 $\mu$m, (with a concentration of 50 g/$Nm^3$, at a temperature of 250° C.), was introduced into the gas inlet port C at a feed rate of 4 $Nm^3$/hour. The temperatures of the cylinder were set to 180° C. in the upstream zone, 250° C. in the transit zone (melt-beginning zone) and 260° C. in the downstream zone. Vacuumizing the vent hole D to 10 Torr., melt-kneading was conducted. After melt-kneading, the mixture was extruded from a spinneret at 265° C., applied with oil and the resulting as-spun yarn was wound on a roll at 1,000 m/min. Then, the undrawn yarn was drawn 3.6 times its original length to produce a polymer-dyed nylon filament yarn of 208 denier/96 fil. The kneading to drawing operations were able to be conducted with good stability.

The resulting polymer-dyed nylon filament yarn had a tensile strength of 3.6 g/d, an elongation at break of 41% and a uniform color.

EXAMPLE 8

Polyethylene pellets having an average molecular weight of 80,000 were fed at a feed rate of 98 kg/hour into the resin feed opening A of the double screw kneader extruder shown in FIG. 5. Air Y containing carbon black having an average particle diameter of 20 nm (with a concentration of 50 g/Nm$^3$, at a temperature of 150° C.) was introduced into the gas inlet port C at a feed rate of 40 Nm$^3$/hour. The temperatures of the cylinder were set to 150° C. in the upstream zone, 230° C. in the transit zone (melt-beginning zone) and 240° C. in the downstream zone. Vacuumizing the vent holes $D_1$ and $D_2$ to 10 Torr., melt-kneading was conducted. After melt-kneading, the mixture was extruded and quenched to form a sheet 0.6 mm thick. Then, this sheet was heat-stretched lengthwise 6.0 times and then crosswise 5.0 times, followed by winding on a roll. The obtained film 20 μm thick was colored in a uniform opaque black color.

EXAMPLE 9

With the apparatus shown in FIG. 7, polyethylene terephthalate having an intrinsic viscosity of 0.65, a temperature of 282° C. and a viscosity of about 3,000 poise was partly taken out through a liquid transfer pipe 10 from a continuous polymerization apparatus (not shown), cooled to 270° C. and fed to a kneader at a feed rate of 83 kg/hour. Nitrogen gas containing calcium carbonate fine particles having an average particle diameter of 0.7 μm which had been treated with stearic acid (with a concentration of 1.0 kg/Nm$^3$, at 280° C.) was fed by jetting with an ejector mechanism (with a feed rate of 17 Nm$^3$/hour, a pressure of 6 kg/cm$^2$), into the gas inlet part C of the horizontal biaxial disk type mixer shown in FIG. 12, and during mixing, the nitrogen gas was discharged from the gas discharge vent B provided on the polyethylene terephthalate exit side. The operation conditions of the reactor mixer were: number of revolutions of 15 r.p.m., an average dwell time of 6 minutes, a pressure of 100 Torr. and a temperature of 280° C.

The obtained film had an intrinsic viscosity of 0.62 and a good whiteness. The film was useful as supports for reflection photographic elements.

EXAMPLE 10

A film was manufactured in the same manner as Example 4, except that the polyethylene terephthalate pellets were fed at a feed rate of 100 kg/hour and hot water suspended with a blue anthraquinone dye in a concentration of 2.0% by weight was introduced at a feed rate of 1.5 kg/hour. The obtained film exhibited a blue color uniform all over. The film was able to be used as a base film for roentgen development.

EXAMPLE 11

An anti-electrostatic nylon fiber was manufactured in the same manner as Example 7, except that nylon-6 pellets were fed into the resin feed opening A at a feed rate of 19.4 kg/hour, water dissolved with 30% by weight of a reaction product of dimethyl terephthalate and an addition product of glycerin with ethylene oxide/propylene oxide (with an addition polymerization weight ratio of 80/20, an average molecular weight of 7,000) was introduced into the inlet port C at a feed rate of 2 kg/hour, and steam was discharged from the gas discharge vent B. The melt-kneading, spinning and drawing were able to be conducted with good stability. The resulting fiber had a tensile strength of 3.2 g/d, an elongation at break of 44% and a good anti-static property.

As explained in detail in the above, the present invention provides a technique to manufacture thermoplastic resin compositions and shaped articles thereof, having fine particles or additives of a particle size of at most 10 μm, particularly of submicron order, dispersed in a high concentration therein. According to the present invention, the wet treating step of the fine particles can be conducted in combination directly with the melt-kneading step and shaping step and thereby there can be attained a great improvement in quality, cost and producibility, which has been considered as difficult to attain according to conventional processes. Furthermore, the process of the present invention is suitable for production of many kinds with small lot and thus provides an industrially very useful polymer process.

What is claimed is:

1. A process for manufacturing a thermoplastic resin composition by compounding a thermoplastic resin with fine particles, which comprises: forming a moving bed of a heat-melted thermoplastic resin; introducing a liquid dispersion of fine particles of at most 10 μm particle diameter into an upstream zone of said moving bed, whereby a dispersing medium of said dispersion is vaporized and removed from said upstream zone and said fine particles are deposited on said moving bed; and conveying said thermoplastic resin incorporated with said fine particles to a downstream zone, wherein the thermoplastic resin is melt-kneaded with said fine particles.

2. The process claimed in claim 1, which further comprises degassing the melted thermoplastic resin in said downstream zone.

3. A process for manufacturing a thermoplastic resin composition by compounding a thermoplastic resin with an additive, which comprises: forming a moving bed of a heat-melted thermoplastic resin; introducing a solution or emulsion of an additive into an upstream zone of said moving bed, whereby a solvent of said solution or a dispersing medium of said emulsion is vaporized and removed from said upstream zone and said additive is separated from said solvent or dispersing medium by being deposited on said moving bed; and conveying said thermoplastic resin incorporated with said additive to a downstream zone, wherein the thermoplastic resin is melt-kneaded with said additive.

4. The process claimed in claim 3, which further comprises degassing the melted thermoplastic resin in said downstream zone.

* * * * *